Oct. 16, 1951

T. L. HALLENBECK 2,571,359

FLUID ACTUATING SYSTEM AND APPARATUS

Filed Oct. 13, 1945

INVENTOR.
Thomas L. Hallenbeck
BY
Harry O. Ernsberger
ATTORNEY.

Oct. 16, 1951 T. L. HALLENBECK 2,571,359
FLUID ACTUATING SYSTEM AND APPARATUS
Filed Oct. 13, 1945 4 Sheets-Sheet 4

INVENTOR.
Thomas L. Hallenbeck
BY Harry O. Ernsberger
ATTORNEY

Patented Oct. 16, 1951

2,571,359

UNITED STATES PATENT OFFICE 2,571,359

FLUID ACTUATING SYSTEM AND APPARATUS

Thomas L. Hallenbeck, Toledo, Ohio, assignor to Baker Bros. Inc., Toledo, Ohio, a corporation of Ohio Application October 13, 1945, Serial No. 622,213

5 Claims. (Cl. 60—52)

This invention relates to a fluid actuating and control system and apparatus and more especially to a fluid system and apparatus adapted for actuating machine elements, tools and the like.

The invention comprehends an arrangement of fluid actuating mechanism for propelling and controlling a relatively movable tool supporting means or the like at different speeds dependent upon the work requirements and to obtain a maximum use of a tool or tools in a minimum of time.

The invention embraces the provision of a hydraulic system for machine tool actuation and control wherein a reversible fluid pump is utilized in conjunction with a controlled reversible actuating means therefor to obtain forward traverse and reverse traverse for a relatively movable machine tool element or unit.

An object of the invention resides in the provision of an hydraulic actuating and control system for actuating machine elements in a plurality of directions wherein flow control and direction of the fluid medium is obtained without the use of reversing valves.

Another object of the invention is the provision of a fluid system for actuating and controlling machine tools or the like wherein the fluid circuit is substantially a closed circuit subject only to a manually variable metering orifice for predetermining the rate of tool or work feed during work performing operations.

Another object of the invention is the provision of a fluid system for actuating and controlling mechanism wherein starting, stopping, and reversing of the fluid driven actuator is controlled by starting, stopping and reversing the motor and fluid pump driven thereby.

Another object of the invention is the provision of a fluid pressure system for actuating a relatively movable element in either direction or effecting a neutral position thereof without the use of fluid direction controlling valves thus obtaining a simple yet highly effective and efficient positive control with a minimum of fluid control units and mechanism.

Still another object is the provision of cam controlled valve means for initiating the rapid flow of fluid in the system to effect rapid traverse of the tool supporting means between successive work performing operations.

A further object is the provision of a hydraulically actuated arrangement for machine elements particularly adapted for use with a motor whose speed torque curve is the same or similar to that of a polyphase induction motor of the high-torque, high slip type whereby such a mechanism operates with increased efficiency under compartively heavy loads with a minimum of circulation of fluid for the hydraulic actuator and a consequent minimum operating temperature for the fluid.

A further object is the provision of simple yet effective pressure relief valves intercalated in the fluid circuits for maintaining the proper working pressures on opposite sides of the fluid actuated element or piston operating in conjunction with a reversible fluid pump to secure forward and reverse traverse of a machine element.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specifications and drawings of a form of the invention, which may be preferred, in which:

While I have shown an arrangement of my invention utilized for actuating and controlling a relatively movable tool carrying head for a machine tool, it is to be understood that I contemplate the use of the system and apparatus of my invention for causing relative movement of the work piece with respect to a stationary work performing tool or tools, or for use with any mechanism wherein the same may be found to have utility.

Figure 1:
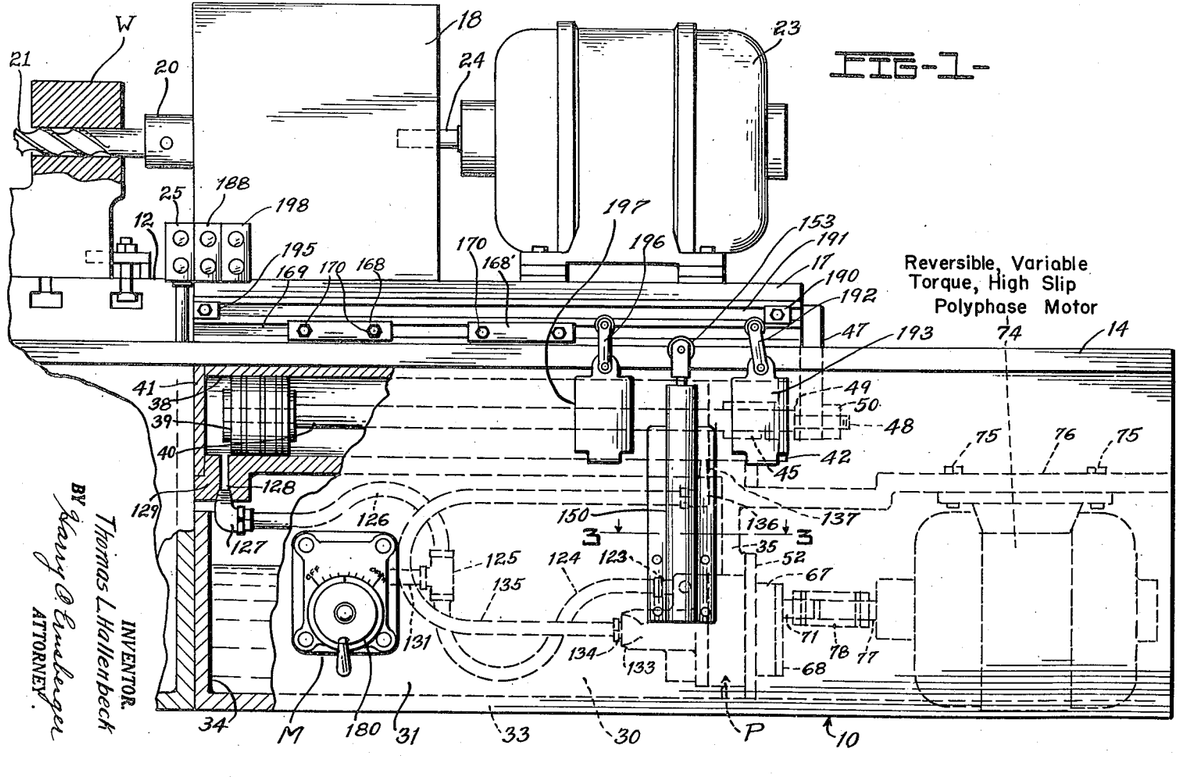
Figure 1 is a side elevational view showing a portion of a horizontal type machine tool embodying a fluid actuating system and apparatus of my invention.
Figure 2:
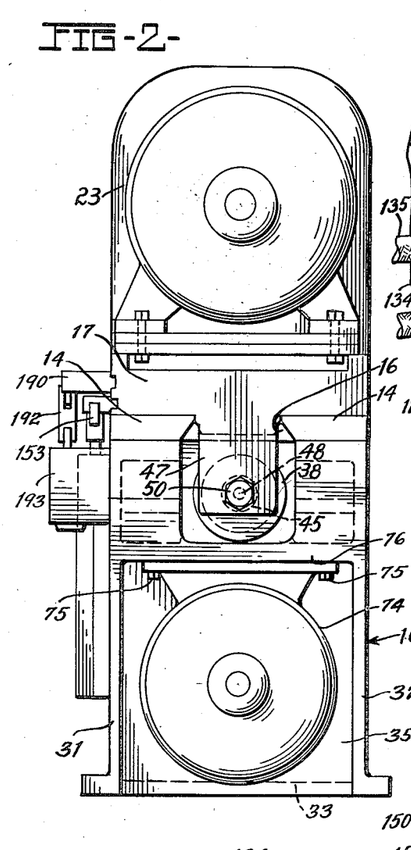
Figure 2 is an end view of the apparatus shown in Figure 1.

Referring to the drawings in detail, there is illustrated in Figures 1 and 2 a bed or frame 10 of a machine tool preferably of the horizontal type used for such operations as boring, reaming, drilling or the like. Mounted upon the bed 10 is a work support 12 upon which is supported the work or work piece W. The upper portion of bed 10 is provided with longitudinally extending ways 14, the oppositely disposed edges being beveled providing diverging angular surfaces to receive and guide a tang 16 depending from a platen 17 the latter being adapted for forward and reverse traverse longitudinally along the ways 14. Mounted upon the relatively movable platen 17 is a housing 18 which encloses and supports suitable gearing (not shown) arranged for driving or operating a spindle or mandrel 20, the latter carrying a tool 21 for performing operations upon the work W. It is to be understood that a plurality of tools and supporting mandrels may be employed driven by gearing contained within the housing 18. The platen 17 also supports an electrically actuated motor 23, the shaft 24 thereof projecting into the housing 18 to drive speed changing gearing contained therein for rotating the tool or tools at varying speeds. The current supply to the motor 23 is controlled by means of a manually operated switch contained within a switch housing 25.

In a machine tool of the character with which my invention is particularly usable, it is desirable to utilize hydraulic means for moving or actuating the tool carrying means to move the tool or tools into engagement with the work piece W. In connection with many types of work, the tool may engage the work in successive places or intervals as the tool progresses to perform several successive work operations upon a single work piece. In order to utilize the machine efficiently and effectively, it is desirable to have a constant, yet comparatively slow feed rate for the tool during its work performing operations, and between work performing operations, to rapidly advance the tool to the position of initiating the next tool "feed" or work performing operation. My invention is inclusive of a system and apparatus for accomplishing these objectives by simple and efficient means. To this end the bed 10 of the machine is provided with a reservoir or sump 30 formed by the side walls 31 and 32, a bottom plate 33, and spaced abutments or end walls 34 and 35. The reservoir or sump 30 is adapted to contain a supply of suitable fluid as, for example, oil for use as an actuating medium.

Disposed above the fluid reservoir 30 is a longitudinally extending cylinder 38 in which is reciprocably mounted a piston 39 fixedly secured to one end of a piston rod 40, the piston and cylinder being referred to as an actuator or actuator unit. One end of the cylinder is closed by an abutment or end plate 41, while the other end is closed by means of a plate 42 formed with a fluid tight stuffing gland 45 through which extends the piston rod 40. The platen 17 is provided with a depending portion or member 47 having an opening adapted to receive a threaded tenon 48 formed on the piston rod 40. Nuts 49 and 50 disposed at either side of the member 47 and threaded on the tenon 48 provide an adjustment between member 47 and the piston rod 40 and also serve to lock the rod to the member 47.

Figures 11, 12:
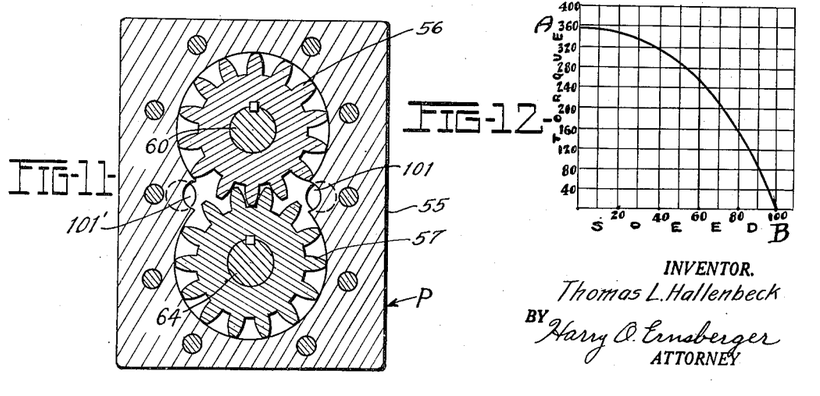
Figure 11 is a detail sectional view taken substantially on the line 11—11 of Figure 3.
Figure 12 is a schematic diagram illustrating speed-torque characteristics of a motor employed with my invention.

Oil or other suitable actuating fluid from the reservoir 30 is injected under pressure into the cylinder 38 to act on the piston 39 and reciprocate the platen 17. The system and apparatus for actuating and controlling the fluid medium for energizing the actuator will now be described. My arrangement includes a means in the form of a bi-directional or reversible hydraulic or fluid pump P operated by means of a reversible electric motor or other mechanism adaptable for driving the pump in reverse directions. In the embodiment of my invention illustrated, the end wall 35 of the reservoir is formed to support a plate 52 secured to end wall by means of bolts 53 or other suitable securing means. Secured to the inner face of the plate 52 is a housing 55 which encloses the pump mechanism. The housing 55 is formed with spaced circular intercommunicating openings as shown in Figure 11 to accommodate pump rotors or gears 56 and 57, the teeth of the rotors intermeshing in the conventional manner. Disposed at the rear of the housing 55 is a casing or housing 58 which with the housing 55 and plate 52 forms a pump body or chamber, the casing 58 being secured to housing 55 and plate 52 by means of bolts 59.

The pump rotor or gear 56 is keyed or otherwise fixedly secured upon a shaft 60 which is journaled in bearings or bushings 61 and 62 mounted respectively in the plate 52 and the casing 58. A second pump rotor or gear 57 meshing with the teeth of gear 56 is keyed upon a shaft 64 journaled in bearings 65 and 66 also mounted respectively in the plate 52 and casing 58. Abutments or plugs 63 provide thrust surfaces for the inner ends of shafts 60 and 64. The plate 52 is formed with an outwardly extending boss portion 67 which supports a cover member 68 held in place by means of screws or bolts 69. The shaft 60 is formed with a reduced tenon portion 71 which projects through an opening in the cover 68, the escape of oil along the shaft being prevented by the employment of fluid tight packing or sealing material 72 contained in a circular recess formed in the cover 68. In the embodiment illustrated, a reversible electric motor 74 for driving the fluid pump is secured by bolts 75 to a horizontal web portion 76 formed integrally with the bed 10 of the machine. As particularly shown in Figure 1, the motor shaft 77 is operatively connected to the tenon portion 71 of shaft 60 by means of a resilient sleeve 78 of reinforced rubber or the like for driving the pump.

The casing 58, in addition to forming a wall of the pump chamber, houses a pair of pre-loaded pressure relief valves and is also formed with chambers or ducts, some of which are provided with gravity valves forming elements of my hydraulic system. The pump unit P and housing 58 are so disposed in the fluid reservoir 30 as to be immersed or partially immersed in the fluid or oil at all times, a feature of simplicity of my arrangement. The casing 58 is formed with rearwardly and laterally extending projections 80 and 81 which are provided with vertically disposed cylindrical openings or bores to receive valve cages 82 and 83, the cages being pressed into the projections. Valve cage 82 is formed with a central cylindrical bore 86, an annular recess or fluid passage 87, a transverse duct 88, a valve seat or abutment 89 and below the latter a passage 90 opening directly into the reservoir 30. Snugly fitted in the bore 86, yet arranged for slidable movement therein, is a valve pin or plunger 92 formed at its lower portion with a tenon terminating in a frusto-conical valve surface 93. The upper portion of the valve cage 82 has an enlarged bore to accommodate a head 95 formed integrally with the plunger 92, the space 96 beneath the head 95 forming a chamber adapted to receive fluid from the passage 88 by means of a minute channel or scratch 97 made to a depth of about three thousandths of an inch provides satisfactory operation to permit extremely slow rate of fluid flow to the chamber 96 for a purpose hereinafter explained. The upper end of the valve cage 82 is threaded exteriorly to receive a cap or closure 98. The head 95 of the plunger 92 is bored to accommodate a resilient member or expansive spring 100 which serves to pre-load the valve plunger 92 and normally prevent escape of fluid past the valve seat 89 and serves, in conjunction with the fluid pump, to establish a predetermined fluid pressure in one circuit of the hydraulic system leading from the pump P. The passage 88 is in communication with a passage 101 leading to one side of the gear pump, passage 101 also communicating with a vertically arranged duct 102 in which is disposed a ball valve 103 or other suitable valve means, the ball 103 seating upon the upper end of a bushing or abutment 104 provided with a passage 105 opening directly into the reservoir or sump 30.

Figure 3:
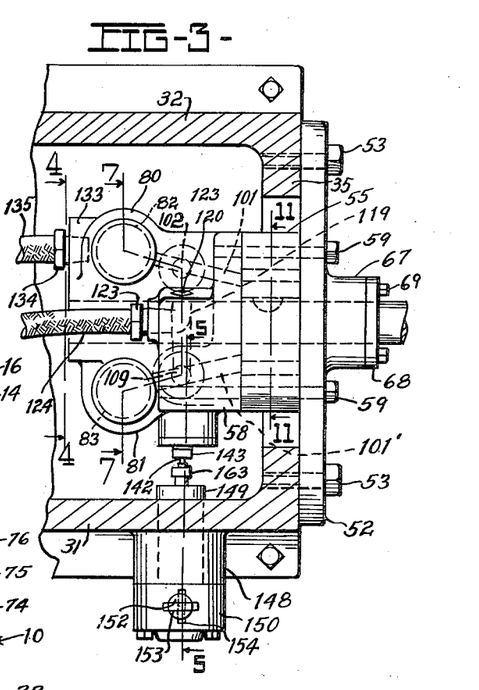
Figure 3 is a sectional view taken substantially on line 3—3 of Figure 1.
Figure 4:
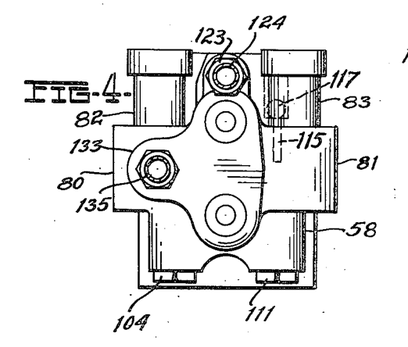
Figure 4 is a view taken substantially on the line 4—4 of Figure 3.

The valve cage 83 is of the same configuration as valve cage 82, and valve pin 92' and cap 98' are of the same construction as pin 92 and cap 98 hereinbefore described. The spring or resilient member 108 is of a different pressure or expansive value as compared with spring 100 for a purpose hereinafter explained. The annular fluid passage 87' and a duct 88' are in communication with a passage 101' leading to the opposite side of the gear pump from that in communication with passage 101. Passage 101' is intercepted by a vertical duct 109 in which is positioned a ball valve 110 seating upon a bushing 111 the latter having a passage 112 opening directly into the fluid reservoir 30. A vertically arranged duct or passage 115 in communication with the horizontal passage 101' is in registration with a larger duct 116 in which is disposed a ball valve 117 for normally closing or blocking the passage 115. The upper end of duct 116 is closed by a threaded plug 118. Diagonally arranged in the housing 58 is a drilled passage 119 in communication with duct 116, the passage 119 having its upper end closed by a threaded plug 120. The housing 58 is bored and threaded to receive a fitting 123 (see Figures 1 and 3) in communication with the diagonally arranged duct 119. The fitting 123 is joined to a flexible tube or hose 124 leading to one leg of a T-shaped fitting 125, the other leg of fitting 125 being connected by a flexible tube 126 to a fitting 127 threaded into an opening or passage 128 formed in a boss 129 formed on a lower portion of the wall of cylinder 38 adjacent the left end thereof as viewed in Figure 1. The side outlet of the T-shaped fitting 125 is connected by a pipe 131 to an adjustable fluid flow control orifice or metering device M which will be hereinafter described.

The housing 58 is formed with a rearwardly extending boss 133 which has a threaded opening in communication with the annular channel or chamber 87 formed in the valve cage 82, a fitting 134 being threaded into the opening in boss 133. The fitting 134 is connected by a flexible tube 135 and an L-shaped fitting 136 with a passage 137 in the wall of cylinder 38 at the right hand end thereof as viewed in Figure 1. Thus the flexible tubes 124, 126 convey fluid to and from the cylinder 38 on one side of the piston 39, while the flexible tube 135 conveys fluid to and from the cylinder 38 at the other side of the piston.

Figure 5:
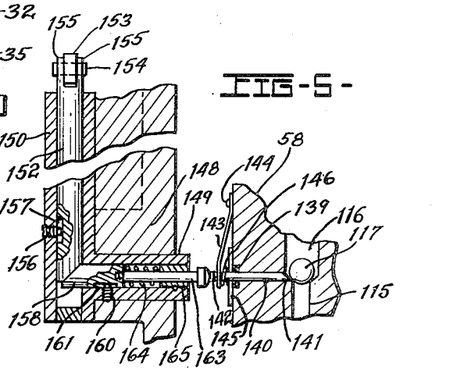
Figure 5 is a detail sectional view taken substantially on the line 5—5 of Figure 3.
Figure 6:
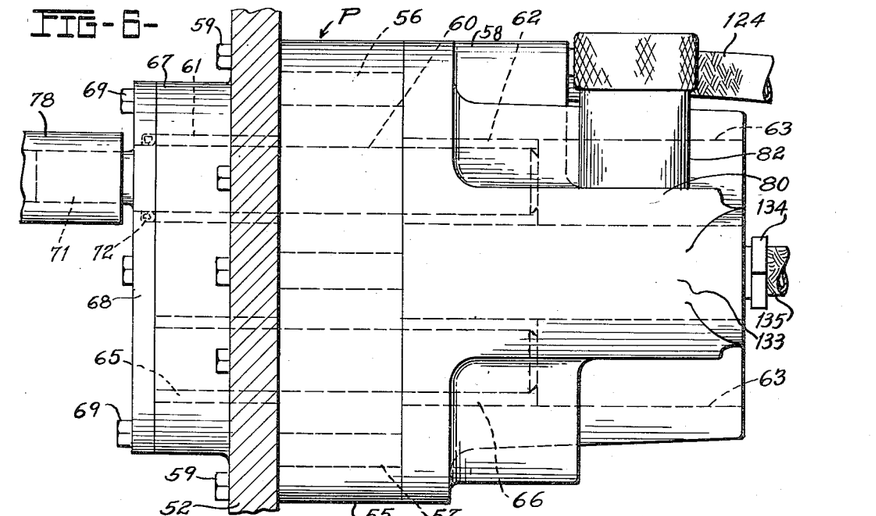
Figure 6 is a side elevational view of the pump and valve unit forming a part of my invention.
Figure 7:
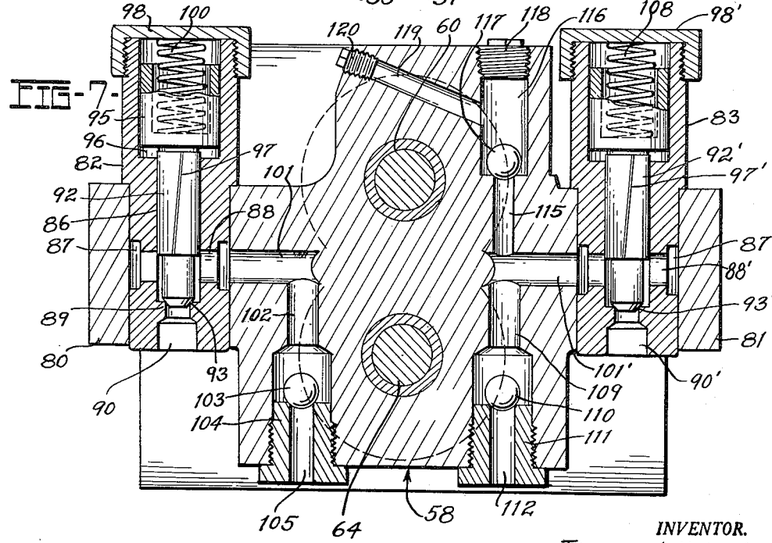
Figure 7 is an expanded sectional view taken substantially on the line 7—7 of Figure 3.
Figures 8, 9:
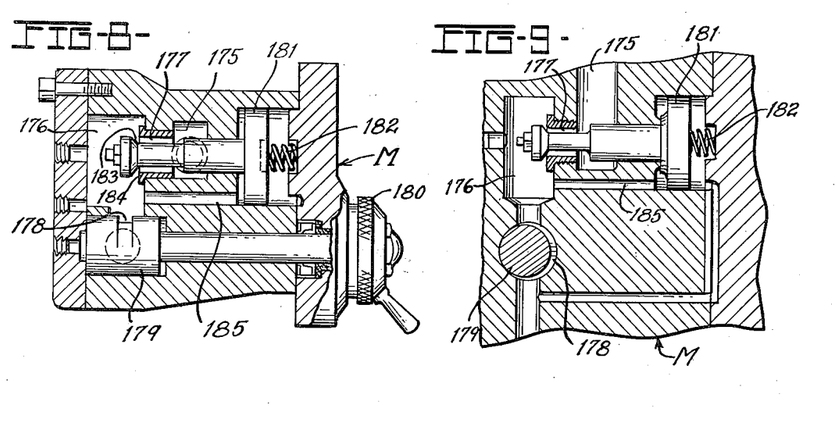
Figure 8 is a sectional view through a manually adjustable metering device.
Figure 9 is a semi-diagrammatic sectional view illustrating the metering device.

Means are provided for securing rapid forward traverse of the platen 17 by the hydraulic means in order that a minimum of time elapse between successive work performing operations of the tool. To this end mechanical means set into operation by mechanism carried by the platen 17 functions to elevate the ball valve 117 to permit flow of fluid downwardly through the passage 115. As particularly shown in Figure 5, the casing 58 is provided with a horizontal bore in which is snugly, yet slidably positioned a valve releasing means or ram 140 configurated with a chamfered end 141 adapted for engagement with the ball valve 117 to elevate the valve and open the passage 115. The portion of ram 140 exteriorly of the casing 58 is formed with oppositely disposed kerfs providing rectangular tenon 142 which is straddled by a yoke formed by a slot in the lower portion of a plate 143 secured to the casing by a screw 144. This arrangement serves to prevent rotation of the ram 140 and maintain the chamfered end of the ram in proper position with respect to the ball 117. A recess formed in casing 58 houses a grommet 139 of rubber or other resilient material which surrounds the ram 140 and provides a seal to prevent seepage of fluid along the ram. A washer 145 cooperating with an expansive coil spring 146 serves to resiliently urge the ram toward its outermost position as shown in Figure 5.

The wall 31 of the reservoir 30 is provided with a boss 148 bored to receive a hollow cylindrical projection 149 formed integrally with a vertically arranged hollow guide or cylinder 150. Slidably mounted in the guide 150 is a rod or plunger 152, the upper end projecting above the cylinder and being slotted to receive a roller 153 journaled upon a transverse pin 154 carried in aligned openings in the spaced tines 155 formed by the slot. The rod 152 is prevented from rotating by means of a screw 156 having a tenon projecting into a longitudinal slot 157 formed in the rod 152. The lower end of rod 152 is scarfed or chamfered on a 45° angle to mate with a similarly scarfed end of a rod or plunger 158 slidably disposed in the hollow interior of the horizontal projection 149. Rod 158 is maintained against rotation by means of a screw 160 having a tenon extending into a longitudinal recess 161 formed in the rod 158. The end of rod 158 opposite the chamfer is bored and threaded to receive the threaded end of an actuating pin 163, the pin having a head arranged for engagement with the end of ram 140. An expansive coil spring 164 surrounds the pin 163 and is retained in place by a bushing or sleeve 165 snugly fitted into the hollow or cylindrical interior of projection 149, the spring serving to urge the rod 158 and pin 163 in a left-hand direction as viewed in Figure 5. The roller 153 is arranged to be engaged by cams or blocks 168, 168' adjustably mounted in a longitudinally extending slot 169 formed in the platen 17. The cams 168, 168' are equipped with screws 170 for adjusting and locking the same in adjusted position. The engagement of a cam block with the roller 153 moves the rod 152 downwardly resulting in corresponding horizontal movement of rod 158, pin 163 and ram 140 to elevate or dislodge the ball valve 117 from its seat and permit flow of fluid into passage 115 to increase the forward traverse speed of platen 17 in a manner hereinafter explained.

A fluid flow control valve or adjustable fluid metering device M is intercalated in the hydraulic system of my invention and serves as a "metering out" means for maintaining a relative constant rate of feed or movement of the working tool during work performing operations. As the metering device is of conventional design and construction, and as it forms no part of the invention per se, it will only be described in such detail as to exemplify its function in my hydraulic system. The side outlet pipe 131 from the T-shaped fitting 125 is connected to the metering device M and communicates with the inlet port 175 through which fluid will flow from the left end of cylinder 38, as the piston 39 is moved to the left as viewed in Figure 1 into the chamber 176 through the opening 177. The fluid in chamber 176 will flow through the eccentric channel or metering orifice 178 formed in a metering shaft 179. The rate of flow of fluid may be regulated by rotating shaft 179 by means of a knurled knob 180 secured upon the shaft 179 and extending exteriorly of the reservoir wall 31 as shown in Figure 1 so as to be readily accessible to the machine operator for effecting speed adjustments of the tool feed as desired. In order that possible variations in operating pressure and varying cutting tool resistances do not affect the rate of flow of fluid through the channel 178, a pressure compensator inclusive of a piston 181, a spring 182, a valve 183 carried by the piston and cooperating with a valve seat 184, and a fluid passage 185 serve or function to maintain a constant pressure in chamber 176. If pressure in the passage 175 rises slightly, pressure in passage 185 rises, elevating piston 181 to restrict the passage between valve 183 and seat 184 until the rate of fluid passing into the chamber 176 is the same as that passing through the channel 178 in the metering shaft. As the rate of discharge of fluid through the channel 178 will thus be maintained constant, the rate of feed or movement of the tool during work performing operations will be substantially constant.

Figure 10:
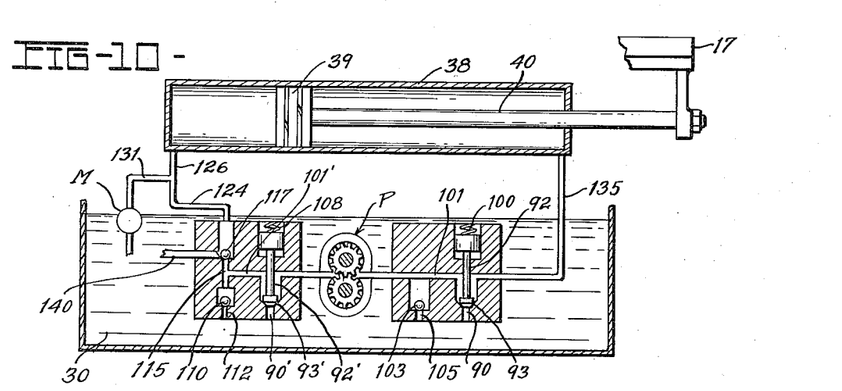
Figure 10 is a schematic view illustrating the hydraulic circuits of the arrangement of my invention.

The hydraulic system of my invention is a substantially closed system subject to the fluid flow through the "metering out" device M. The quantity of fluid passing through the metering device is, however, replaced in the hydraulic circuits from the sump 30 through passages 105 and 112 past the gravity ball valves 103 and 110, as all fluid passages to the sump 30 are at all times below the surface of the oil or fluid therein. The following is an explanation of a typical work performing cycle. Assuming the work piece W has spaced walls or portions which are to be successively drilled or bored by means of a tool 21 carried by the tool holding spindle 20, the sequence of operations is as follows: The switch 25 is thrown to "on" position energizing the motor 23 for rotating the work performing tool 21. Assuming that the platen 17 is at the extreme right hand end of the bed of the machine with the tool 21 spaced from the work W, the switch 188 is manually actuated energizing the electric motor 74 to rotate in one direction and drive the reversible gear pump or fluid actuating means P in one direction. The pump is rotated in a direction to dispatch oil or other fluid from the inlet side of the pump, viz. this being the passage 101', to the outlet passage 101 and through the series of communicating passages and tubes 88, 135 and 137 whereby the fluid is forced into the right hand end of the cylinder 38 and against the piston 39 to force the latter toward the left hand end of the cylinder. As the cam block 168 is then in engagement with roller 153, plunger 140 is at its innermost position, elevating ball valve 117, so that fluid in the left end of cylinder 38 may flow comparatively rapidly past the valve 117 resulting in rapid traverse of the tool 21 toward the work W. The cam block 168 is so adjusted that as tool 21 moves adjacent the work W, block 168 moves out of engagement with roller 153, thus permitting the ball valve 117 to close as shaft 140 is moved out of engagement with the valve 117 under the influence of spring 146, as illustrated in Figure 5. This action initiates the first of the series of tool feeding operations through the work W. By reason of the pressure in the right hand end of the cylinder, the fluid on the opposite side of the piston is being forced through channel 178 of the "metering out" valve M at a restricted rate, the valve having been previously manually adjusted to the proper feed rate for work performing operations of the tool by manipulation of the shaft 179. The fluid passing through the metering device is delivered directly into the sump 30. During the forward tool feed movement of the platen 17, the fluid supply to the then inlet side of the pump is supplied from the sump 30 through the passage 112 past the ball valve 110 to the pump chamber. If excessive fluid pressure builds up in the right hand end of the cylinder 38 during a drilling operation, the relief valve 93 opens, and thus maintains a substantially constant pressure acting to move the tool 21 through the work W. At the completion of the first work performing operation or drilling operation of the tool 21, assuming for purposes of illustration, that it is desired to drill aligned openings in spaced portions of the work, the second cam block 168' is adjusted to engage the roller 153 carried by the vertical plunger 152. Engagement of the cam 168' with the roller 153 forces the rod 152 downwardly, the latter in turn moving rod 158 horizontally bringing the pin 163 carried by the horizontal rod 158 into engagement with the ram 140 and forcing the latter into contact with the ball valve 117 to elevate the latter, permitting comparatively free flow of fluid from the left hand end of the cylinder through the passage 115 directly to the inlet side of the pump. When passage 115 is thus opened, the rate of fluid flow from the left hand end of the cylinder is increased, causing the tool supporting platen to traverse forwardly at a comparatively rapid rate. This motion continues until the cam block 168' moves out of engagement with the roller 153 permitting the ball valve 117 to again "seat," closing the passage 115 so that thereafter the platen moves at a comparatively slow "tool feed rate" to perform the second work performing operation. During forward rapid traverse of the piston 39 and the tool supporting platen, the valve 117 is in open position and fluid is pumped to the right hand end of the fluid actuator as viewed in Figure 10, the difference in volume of the fluid at each side of the piston by reason of the presence of the piston rod 40 is taken care of by the opening of the valve 92'. The springs 100 and 108, respectively controlling the opening of the valves 92 and 92', are proportioned so that the valve 92' opens under a lesser fluid pressure than valve 92. Hence, the opening of valve 92' at a lesser pressure than valve 92 eliminates the setting up of any back pressure so that the pump will not be slowed down and rapid forward traverse movements satisfactorily attained. When the second work performing operation is completed, an adjustable block or abutment 190 carried in a slot 191 formed at the side of the platen 17 engages a switch lever 192 which controls a current reversing switch of conventional design mounted in the switch housing 193 which reverses the direction of rotation of the motor 74 driving the fluid pump, and hence reverses the direction of rotation of the fluid pump P. Upon reversal of rotation of the fluid pump, the flow of fluid is reversed in the hydraulic circuits so that fluid flows past the ball valve 117 and through communicating passages 115, 116, 119 and tubes 124, 126 and passage 128 into the left hand end of the cylinder forcing the piston 39, piston rod 40 and platen 17 in reverse traverse direction to return to its initial or starting position, thus completing a series of work performing operations or a complete cycle. Due to the reverse direction of rotation of the fluid pump and the fact that oil may freely pass upwardly through the passage 115, the fluid in the right hand end of the cylinder flows to the pump through tubes and communicating passages 137, 135, 88, 101, and the former inlet passage 101' of the pump becomes the pump outlet to direct quantity flow of fluid into the left hand end of the cylinder. This flow of fluid occurs at a rapid rate by reason of the fact that the fluid may flow upwardly past the ball valve 117 practically unimpeded, and thus causes a rapid reverse traverse of the platen toward its initial position at the extreme right end of the machine bed 10. When the platen approaches its initial or starting position, a second block 195 carried in the slot 191 in the platen 17 engages another switch lever 196 connected to a switch mechanism contained within switch housing 197 which stops the current flow to the motor 74 and hence the pump ceases to rotate, bringing the platen 17 to rest. The finished work piece may be removed and an unfinished work piece secured to the work support and the cycle of operations repeated by starting the motor 74 by means of switch 188. Manual reversal of the motor may be had by manipulation of switch 198. A neutral or "stop" position of the arrangement is obtained by interrupting the electric circuit to the pump driving motor 74 by the manual switches 188, 198, or by the block 195 engaging switch lever 196. Any number of cam blocks similar to blocks 168, 168' may be employed depending upon the number of individual work performing operations to be had on each work piece.

As hereinbefore described, the hydraulic circuits leading away from each side of the fluid pump are provided with pressure relief valves carried in the valve cages 82 and 83 respectively. The relief valve pin 92 is urged toward closed position by the spring 100 which is arranged to exert a predetermined pressure downwardly upon the valve pin to urge it to closed position. The factor determining this spring pressure is dependent upon the fluid pressure desired in the right hand end of the cylinder acting upon the piston or actuator 40 during the forward tool feed traverse operations. It should be noted that this relief valve is so constructed as to cause a gradual relief or overload pressure so that a rapid fluctuation of movement or jerking or "grabbing" of the tool passing through the work is prevented. Should the pressure in the hydraulic circuit leading to the right hand end of the cylinder exceed a predetermined value as determined by the pressure of spring 100, fluid seeps through the scratch or channel 97 into chamber 96 beneath the head 95 of the valve pin 92. Due to the area of the lower surface of head 95, the fluid pressure slowly elevates the valve pin 92 compressing the spring 100 and withdrawing the valve 93 from its seat, thus permitting fluid to flow past this valve directly into the sump 30 until the pressure in said fluid circuit drops to its predetermined value, when the spring 100 again closes the valve 93. The valve pin 92' mounted in valve cage 83 and normally held closed by spring 108 operates to permit fluid to flow past valve 93' through passage 90' in a similar manner to prevent an excess of pressure developing in the left hand end of the cylinder during reverse traverse of the piston 39 in the cylinder 38. The springs 100 and 108 in both pressure relief valve units may be proportioned or calibrated to obtain and maintain the proper working pressures in the hydraulic circuits leading to both ends of the cylinder 38.

It should be noted that in the arrangement of my invention, complete control of the actuator for tool movement is obtained without the use of any diverting or multi-way valves, whereby the hydraulic operation and control of a machine tool is extremely positive in operation, yet very simple and efficient and is obtained with a minimum of moving elements.

It is to be understood that the hydraulic system of my invention may be utilized for moving the work piece with respect to a relatively stationary tool or tools without departing from the spirit of the invention.

While the fluid circulating pump of my invention may be utilized with or driven by a substantially constant speed reversible motor and will give satisfactory operation therewith, I have found that the efficiency and operating characteristics of the arrangement are improved through the utilization of an electric motor for driving the pump of a type having high torque and high slip characteristics. Figure 12 is a schematic diagram illustrating a typical speed-torque curve of a motor of the high torque, high slip type. The horizontal ordinates indicate percent of full load torque while the vertical lines indicate the percent of synchronous speed. Along the curve designated AB, the intersection of a horizontal ordinate with a vertical line indicates a particular speed for the percent of full load torque which may be derived from a typical motor of this character.

A high torque, high slip reversible motor with my hydraulic system will drive the fluid pump P at a compartively high speed when the device is under no load or under a comparatively small load. This situation will obtain during rapid traverse periods of an operating cycle of the system. When however the tool is brought into engagement with the work, and load thereby increased upon the fluid actuator and upon the fluid pump P, the motor will then operate at high torque and at a correspondingly lower speed. The speed of the fluid pump P will thus be decreased while the tool moves through the work at a substantially constant rate determined by the amount of fluid passing through the "metering out" device M. This arrangement has distinct advantages in that the pump P, having been reduced in speed by reason of the reduction in motor speed, will therefore dispatch only the amount of oil or fluid to the actuator cylinder 38 as is required without causing relief valve 92 to open. Through this arrangement of my invention utilizing a high torque, slip motor, the fluid pump P, during a work performing cycle of the tool, will be slowed down thus circulating a minimum amount of oil. Excessive circulation of oil normally increases the oil temperature. In this form of my invention the excess heat, which would otherwise be adsorbed into the circulating oil, will be dissipated in the electric motor where it is readily radiated into the surrounding atmosphere, thus preventing the oil in the system from unnecessary heating.

It should also be noted that when the actuator is brought to a stop, it is accomplished by de-energizing the motor 74 which stops the rotation of the pump. This feature reduces the periods of oil circulation to a minimum. This is a distinct advantage over prior devices wherein the stopping of an actuator is accomplished by manipulation of valve mechanisms or other devices wherein the pump continues to rotate while the circulating oil continues through by-pass channels causing the oil to become heated.

When the direction of movement of the actuator is reversed through the action of abutments 190 and 195 engaging switch arms 192 and 196, the motor is stopped and quickly reversed, so that there is substantially no excessive circulation of oil through this action. Otherwise, "neutral" or static position of the actuator is obtained by stopping the motor and the fluid pump.

It is apparent that, within the scope of the invention, modifications and different arrangements may be made other than is herein disclosed, and the present disclosure is illustrative merely, the invention comprehending all variations thereof.

What I claim is:

1. In combination, an hydraulic actuator for propelling machine elements and the like which includes a cylinder and piston reciprocable therein; a rotary pumping means; a variable-torque reversible motor for driving and controlling the direction of rotation of the pumping means to selectively deliver fluid under pressure to the ends of the actuator to drive the piston in different directions; the rate of speed of the motor and the volume of fluid delivered by the pumping means to the cylinder at one side of the piston being dependent upon the degree of fluid resistance existing in the cylinder at the other side of the piston; a fluid supply for the pumping means; an adjustable metering device intercalated in a fluid circuit between the pumping means and the actuator for regulating the rate of movement of said actuator; and means supplementing said metering device for increasing fluid flow in the circuit to increase the rate of movement of the actuator.

2. In combination with a machine tool having a work supporting member and a tool supporting member; means including an hydraulic actuator for causing relative movement between said members whereby a tool may effect useful operations upon a work piece; a reversible fluid pump; said actuator including a cylinder and piston reciprocable therein; a fluid connection between one side of the pump and one end of the cylinder; a fluid connection between the other side of said pump and the opposite end of said cylinder; an adjustable metering means for diverting fluid from one end of the cylinder to predetermine the normal rate of relative movement between said members during work performing operations; means for increasing the rate of relative movement of said members between successive work performing operations including a valved passage associated with one of said fluid connections; cam means carried by the relatively movable member; means adapted to be operated by engagement with said cam means for releasing the valve in said passage to increase the rate of flow of fluid from said cylinder between successive work performing operations; a reversible electrically actuated variable torque motor for driving said pump; the speed of said motor and the rate of flow of the fluid delivered by said pump to said cylinder at one side of the piston being dependent upon the fluid pressure existing on the other side of the piston; switching means for reversing said motor upon completion of a series of work performing operations to cause fluid flow through the valved passage to the cylinder to reverse the direction of relative movement of said work supporting and tool carrying members; the valve in said passage being elevated from its seat by flow of fluid in the reverse direction whereby the piston is moved toward the other end of the cylinder at a comparatively rapid rate.

3. In combination, a fluid actuating means for a relatively movable machine tool element including a cylinder and a piston reciprocable therein; a reversible fluid pump; fluid connections between said pump and said cylinder whereby said piston may be reciprocated in either direction by reversing said fluid pump; means including an adjustable fluid diverting device for determining the rate of forward traverse of the tool element during work performing operations; means for increasing the speed of forward traverse of the tool element between successive work performing operations comprising a valve in one of said fluid connections normally adapted to restrict the flow of fluid in one direction in the circuit; means for unseating the valve; said means including a cam adjustably mounted upon the machine tool element; mechanism associated with said cam operable to unseat the valve and augment the flow of fluid through the fluid connections to increase the speed of forward traverse of the tool element; said valve being arranged to open upon reverse flow of fluid in the circuit to secure rapid reverse traverse of the machine tool element after the completion of work performing operations, an electrically energizable high slip, high torque polyphase motor for driving said reversible fluid pump, the speed of said motor and the rate of flow of fluid delivered to said cylinder at one side of the piston being dependent upon the degree of fluid resistance existing on the other side of the piston; and switching means for controlling said motor.

4. In combination; an hydraulic actuator including a cylinder and piston reciprocable therein; a reversible fluid pump; a high torque, high slip polyphase reversible motor for operating said pump; fluid passages connecting said pump with the ends of said cylinder; a metering orifice connected with one of said passages for determining a relatively slow speed of said piston in one direction of movement; a valve in one of said fluid passages; means for actuating said valve to increase the rate of discharge of fluid from one end of said cylinder to obtain rapid traverse of said piston; said valve being arranged whereby reversal of the pump provides substantially unobstructed flow of fluid to the opposite end of said cylinder to obtain rapid traverse of said piston in the opposite direction, the speed of said motor and the rate of flow of fluid delivered by the pump to said cylinder at one side of the piston being inversely proportional to the fluid pressure existing in said cylinder at the other side of the piston.

5. In combination, an hydraulic actuator including a fluid propelled member; a fluid pump; fluid passages for conveying fluid under pressure to move said member; a high torque, high slip polyphase motor for operating said pump; said motor being reversible for driving said pump in either direction to effect a change in the direction of movement of said fluid propelled member; the speed of said motor and the rate of flow of fluid by said pump operative at one side of the fluid propelled member being inversely proportional to the degree of fluid pressure existent at the other side of said member; an adjustable fluid metering orifice for bleeding fluid from one of said passages for determining a relatively slow rate of forward traverse of said fluid propelled member; a valve in one of said passages; mechanical means for opening said valve to establish substantially free flow of fluid from one side of said fluid propelled member whereby the motor speed and rate of fluid discharge from said pump is increased to obtain a rapid forward traverse of said actuator; said valve being arranged to open upon reverse flow of fluid to provide for unobstructed fluid flow to said actuator whereby the motor speed is increased to obtain rapid traverse of said fluid propelled member in the opposite direction.

THOMAS L. HALLENBECK.

REFERENCES CITED

The following references are of record in the file of this patent:

UNITED STATES PATENTS

| Number | Name | Date |
| --- | --- | --- |
| 1,616,841 | Beebe | Feb. 8, 1927 |
| 1,948,951 | Walker | Feb. 27, 1934 |
| 2,000,553 | Alden | May 7, 1935 |
| 2,063,414 | Tweddell | Dec. 8, 1936 |
| 2,166,423 | Clark | July 18, 1939 |
| 2,193,497 | Spire | Mar. 12, 1940 |
| 2,285,069 | Vickers | June 2, 1942 |
| 2,365,748 | Curtis | Dec. 26, 1944 |
| 2,374,774 | Olsen | May 1, 1945 |
| 2,389,164 | Payne | Nov. 20, 1945 |
| 2,397,814 | Seborg et al. | Apr. 2, 1946 |